United States Patent [19]

Suzuki

[11] Patent Number: 5,482,102
[45] Date of Patent: Jan. 9, 1996

[54] PNEUMATIC MOTORCYCLE TIRE FOR IMPROVED CORNERING AND STRAIGHT RUNNING STABILITY

[75] Inventor: Shigehiko Suzuki, Amagasaki, Japan

[73] Assignee: Sumitomo Rubber Industries, Ltd., Kobe, Japan

[21] Appl. No.: 251,970

[22] Filed: Jun. 1, 1994

[30] Foreign Application Priority Data

Jun. 7, 1993 [JP] Japan ................................ 5-164002
Apr. 4, 1994 [JP] Japan ................................ 6-090594

[51] Int. Cl.⁶ .............................. B60C 9/09; B60C 9/22
[52] U.S. Cl. ..................... 152/530; 152/526; 152/531; 152/533; 152/537; 152/538; 152/550; 152/555; 152/561; 152/564
[58] Field of Search ....................... 152/531, 533, 152/534, 555, 554, 561, 526, 538, 537, 564, 546, 530, 550

[56] References Cited

U.S. PATENT DOCUMENTS

| | | | |
|---|---|---|---|
| 3,058,509 | 10/1962 | Maiocchi | 152/555 |
| 3,386,487 | 6/1968 | Massoubre | 152/555 |
| 3,509,930 | 5/1970 | Mirtain | 152/555 |
| 4,185,675 | 1/1980 | Greiner et al. | 152/555 |
| 4,744,400 | 5/1988 | Sekoguchi | 152/555 |
| 5,014,761 | 5/1991 | Noma et al. | 152/527 |
| 5,198,051 | 3/1993 | Suzuki et al. | 152/524 |

FOREIGN PATENT DOCUMENTS

| | | |
|---|---|---|
| 0219311 | 4/1987 | European Pat. Off. . |
| 0453294 | 10/1991 | European Pat. Off. . |
| 0483710 | 5/1992 | European Pat. Off. . |
| 2380907 | 9/1978 | France . |
| 3411666 | 10/1984 | Germany . |
| 214404 | 12/1983 | Japan ................................ 152/555 |

*Primary Examiner*—Geoffrey L. Knable
*Attorney, Agent, or Firm*—Birch, Stewart Kolasch & Birch

[57] ABSTRACT

A pneumatic motorcycle tire provided with a spiral belt and a pair of axially spaced reinforcing layers radially inside of the belt to improve the cornering stability and straight running stability of a motorcycle.

3 Claims, 7 Drawing Sheets

CONTENTIONAL
Fig. 7B
CONVENTIONAL
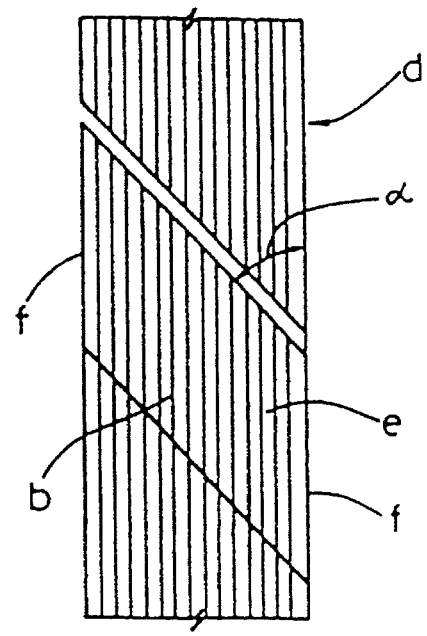

1

PNEUMATIC MOTORCYCLE TIRE FOR IMPROVED CORNERING AND STRAIGHT RUNNING STABILITY

BACKGROUND OF THE INVENTION

1. Field of the Invention

The present invention relates to a pneumatic motorcycle tire, which is provided with a spiral belt and a pair of axially spaced reinforcing layers radially inside of the belt to improve the cornering stability and straight running stability.

2. Description of the Background Art

Recently, as the expressway network has become widely developed, the demand for high speed running of motorcycles is increasing.

The radial tire for such motorcycles was hitherto designed and manufactured on the basis of a radial tire for a four-wheel vehicle, and it could not follow up the cornering performance and straight running performance which are characteristic of a motorcycle. In particular, high speed steering stability was inferior.

As a reason therefor, a conventional belt 1 for reinforcing the tread portion was disposed in the same way as in the four-wheel vehicle, with inclining its cords (b) at 13 to 30 degrees to the tire equator as shown in FIG. 7(A). Such belt (a) with the inclined cords (b) was, as shown in FIG. 7(B), formed by cutting a sheet (d) of tire fabric having cords (b) extending in the longitudinal direction thereof, by the same angle as the inclination angle (alpha) of the cords (d) of the belt (a), to form a parallelopiped pieces (e), and linking them in a series, with abutting the edges (f) of the pieces (e). Thus, the formed belt (a) has abutting parts (f) passing obliquely to the tire axial direction. As the abutting part does not contact with the ground simultaneously during running, the handling becomes unstable, and the straight running performance is impeded. Further, during cornering, handling is also unstable. These occur particularly during high speed running.

In order to solve part of these problems, a tire having a belt formed by spirally winding a narrow and long ribbon-shaped strip has been proposed. In this tire, as shown in FIG. 8, one ribbon-shaped strip (g) is wound continuously from one end to the other end of the belt (h). Therefore, the belt (h) provides a uniform rigidity or a constant reinforcement for both the tread central region (j) and shoulder region (k).

On the other hand, as a motorcycle is inclined largely during cornering unlike the four-wheel vehicles, a larger camber thrust must be generated during cornering.

The above-mentioned tire having the uniformly reinforced tread portion can be improved in the straight running performance, but the tread portion is liable to collapse by the lateral force applied during cornering, and the cornering performance is deteriorated. This phenomenon is particularly notable when the belt is formed by spirally winding a ribbon-shaped strip. As the ribbon-shaped strip is wound spirally, the cords in the ribbon-shaped strip are wound at nearly 0 degrees to the tire equator. As a result, the resistance of the carcass and belt against lateral force is poor.

In order to increase the resistance against lateral force, if a reinforcing cord layer (m) made of a sheet of conventional tire fabric is disposed over the entire width of the belt (g) as shown in FIG. 9, the rigidity of the tread shoulder region is improved, and the camber thrust occurs and becomes a large value early when the motorcycle makes a turn, whereby the cornering performance can be improved.

However, the ground contact and steering stability during straight running are deteriorated since the tread central region (j) is increased in the bending rigidity.

SUMMARY OF THE INVENTION

It is an object of the present invention to provide a pneumatic motorcycle tire which is improved in both the cornering stability and straight running stability.

According to one aspect of the present invention, a pneumatic motorcycle tire comprises a tread portion with axial edges, the tread portion curved so that the maximum cross sectional width of the tire lies between the tread edges, a pair of axially spaced bead portions, a pair of sidewall portions extending between the tread edges and the bead portions, a pair of bead cores one disposed in each bead portion, a carcass having a main portion extending between the bead portions through the tread portion and sidewall portions, and a pair of turned up portions each turned up around each bead core, a belt disposed radially outside the carcass and inside the tread portion, the belt formed by spirally winding a ribbon-shaped strip of rubber in which a single cord or a plurality of parallel cords are embedded along the longitudinal direction thereof, at a small angle to the tire equator, a pair of reinforcing cord layers disposed radially inside of the belt, each reinforcing cord layer extending from a point P1 in the tread portion into the sidewall portion over the belt edge along the outer surface of the carcass, the point P1 spaced apart from the tire equator such that, when a normal line is drawn normal to the tread surface through the point P1, the distance measured along the tread surface from the tire equator to the normal line is in the range of from 0.2 to 0.3 times the tread surface width WT measured along the tread surface from one tread edge to the other tread edge, each reinforcing cord layer comprising a ply of parallel organic fiber cords inclined at an angle of 20 to 70 degrees to the tire equator, the ply rubberized with a topping rubber having a 100% modulus of 25 to 55 kgf/cm$^2$.

Accordingly, as the belt is formed by spirally winding a single cord or a plurality of cords at a small inclination angle to the tire equator, the belt is continuous in the circumferential direction in contradistinction to the conventional cut ply belt shown in FIG. 7(B). Therefore, the running stability and ride comfort are improved.

Since the reinforcing cord layer extends from the middle point P1 between the tire equator and tread edge into the sidewall portion, the tread shoulder region is reinforced greatly than the tread central part. Therefore, the collapse of the tread portion caused during cornering by giving a bank angle to the motorcycle can be prevented. Further, the low or medium speed cornering becomes stable since the rigidity of the tread shoulder region is increased. Also, the high speed cornering becomes stable since the belt cord is continuous in the circumferential direction.

Further, since the reinforcing cord layers are disposed radially inside of the belt, the straight running is stable and the straight running performance is not lowered, although the cords are not parallel to the tire equator.

Furthermore, since the reinforcing cord layer is formed independently from the belt and carcass, the tread rigidity can be adjusted easily, as compared with such a tread portion reinforced with a multi-ply belt or an extension of the carcass turned up portion.

If the distance of the point P1 is less than 0.2 times the tread width WT, the width of the overlap of the reinforcing cord layer with the belt is excessively increased, and the ride comfort and ground contact performance during straight running are deteriorated. Further, the tire weight, fuel consumption, running noise increase and production cost increase.

If the distance is more than 0.3 times WT, the running stability becomes lowered during slow cornering with a small bank angle since the reinforcing cord layer is located away from the ground contacting region. If the 100% modulus of the topping rubber for the reinforcing cords is less than 25 kgf/cm$^2$, the lateral rigidity from the tread shoulder region to the sidewall portion becomes insufficient, and the camber thrust also becomes insufficient for the camber angle. And the time lag for the generation of camber thrust becomes large, thereby resulting in unsteady of the machine, and the high speed steering performance is deteriorated. To the contrary, if the 100% modulus is more than 55 kgf/cm$^2$, the ride comfort during straight running is greatly deteriorated.

In the present invention, thus, the cornering performance and straight running performance are improved.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the present invention will now be described in detail in conjunction with the drawings.

DETAILED DESCRIPTION OF THE PREFERRED EMBODIMENTS

Figure 1:
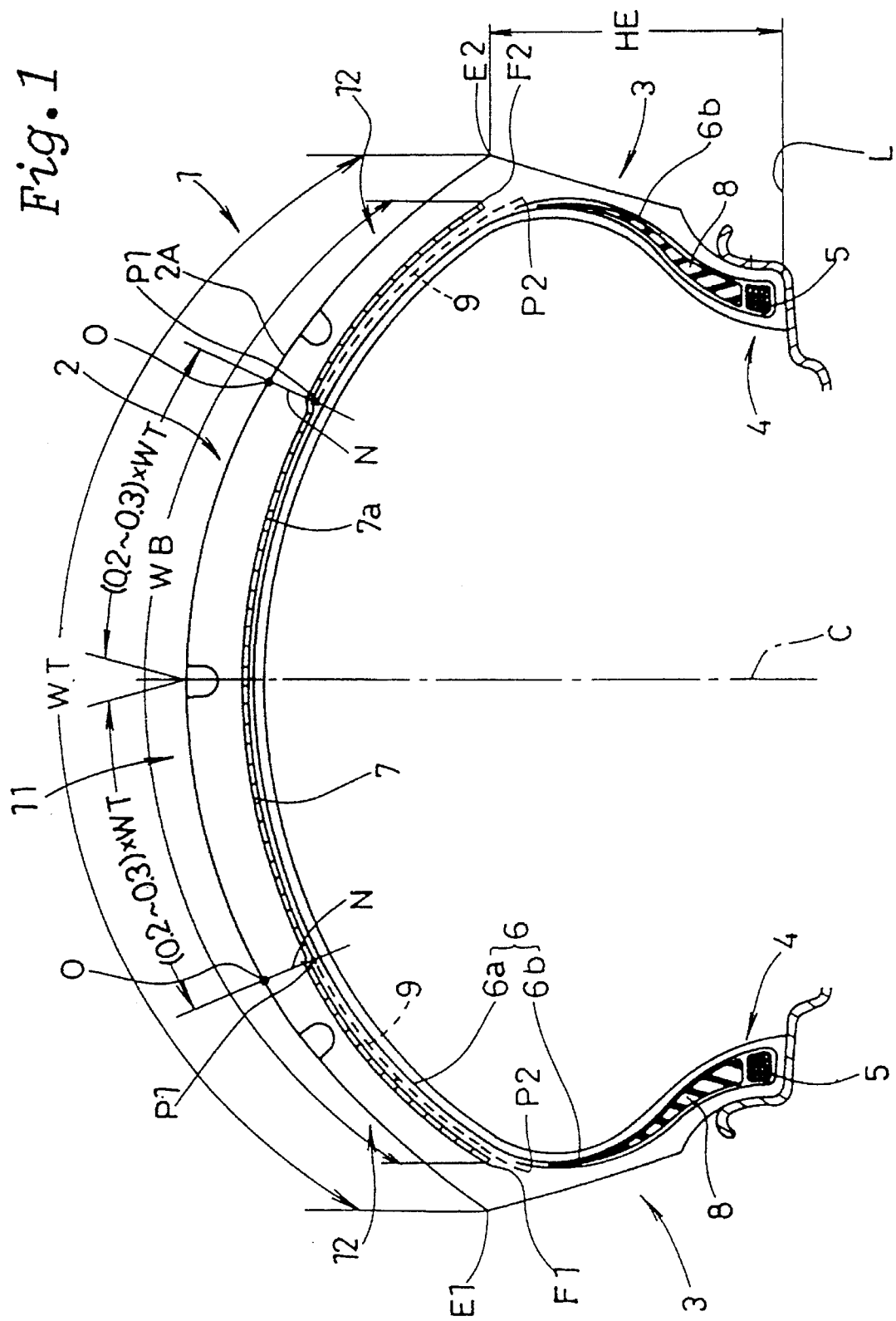
FIG. 1 is a cross sectional view showing an embodiment of the present invention.
Figure 2:
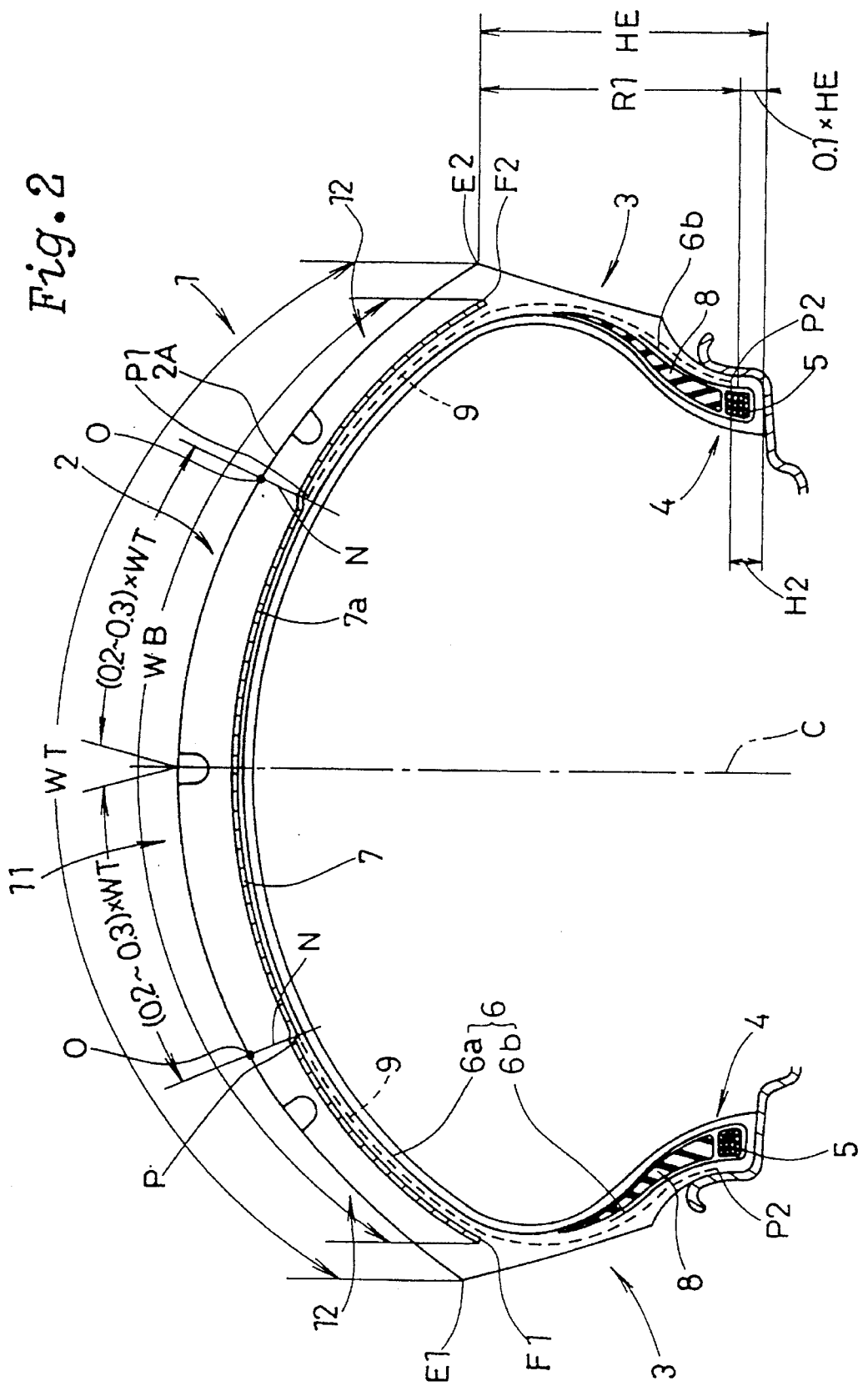
FIG. 2 is a cross sectional view showing another embodiment of the present invention.
Figure 3:
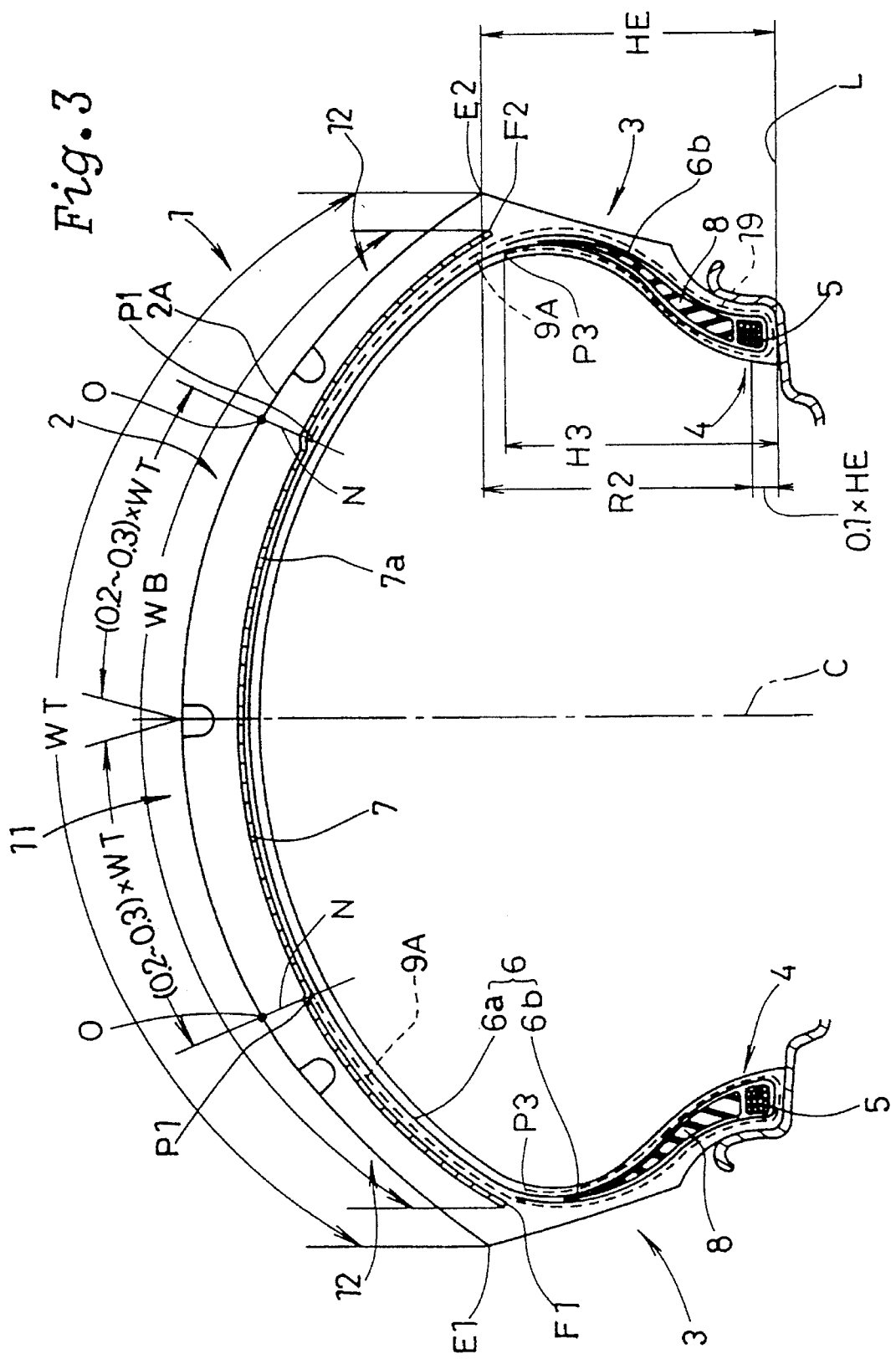
FIG. 3 is a cross sectional view showing still another embodiment of the present invention.
Figure 4:
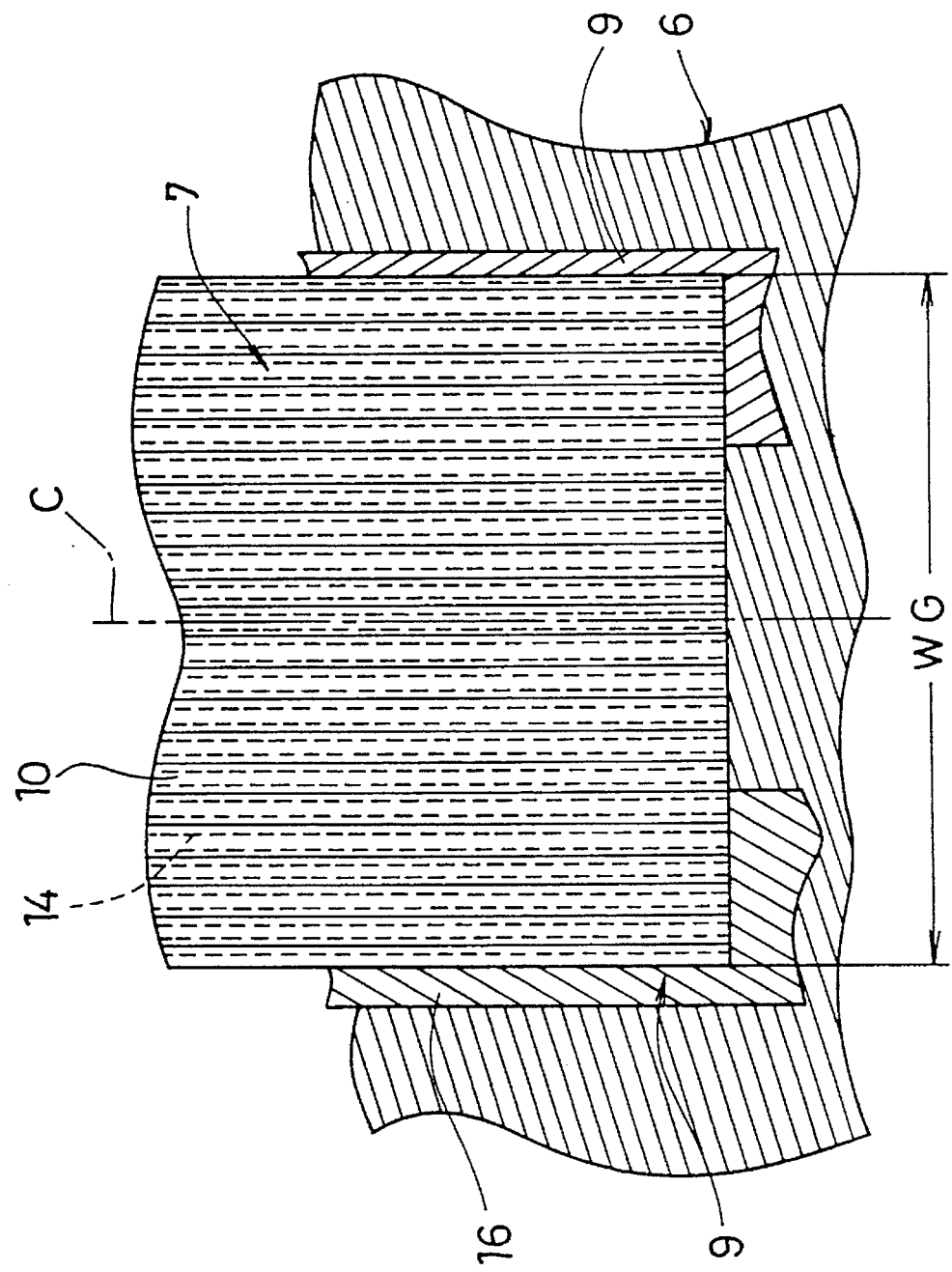
FIG. 4 is a developed plan view of the belt and the reinforcing cord layers showing an example of the cord arrangement.

In FIGS. 1–3, a pneumatic motorcycle tire 1 comprises a tread portion 2 with a tread surface 2A and tread edges E1 and E2, a pair of axially spaced bead portions 4 with a bead core 5 therein, and a pair of sidewall portions 3 extending between the tread edges and bead portions. Further, the tire 1 comprises a carcass 6, a belt 7 and a pair of bead apexes 8.

In the tire meridian section, the tread surface 2A between the tread edges E1 and E2 is provided with a curved profile formed by a circular arc, and the maximum tire section width lies between the tread edges E1 and E2.

The carcass 6 comprises at least one ply, in FIGS. 1, 2 and 3 only one ply, having a main portion 6a extending between the bead portions 4 through the tread portion 2 and sidewall portions 3, and a pair of turned up portions 6b each turned up around each of the bead cores 5 from the axially inside to outside of the tire. The or each carcass ply is made of cords arranged radially at an angle in the range of from 70 to 90 degrees with respect to the tire equator C to have a radial or semiradial ply construction. For the carcass cords, organic fiber cords, e.g. nylon, rayon, polyester, aromatic polyamide and the like are used.

The radially outer end of the carcass turned up portion 6b is extended radially outwardly from the bead portion 4 to a position near the belt edge in FIGS. 1 and 3 or a position about 50% of the tread edge height HE in FIG. 2.

Each of the bead apexes 8 is disposed in each bead portion 4 between the carcass main portion 6a and each turned up portion 6b and radially outside of the bead core 5. The bead apex 8 is made of rubber having a Shore A hardness in a range of 40 to 95 degrees and a triangular shape tapering radially outward from the bead core. The upper end of the bead apex is extended near the tread edge.

The belt 7 is disposed radially outside the carcass 6 and inside the tread portion 2. The belt 7 consists of one ply of a single cord or a plurality of cords wound spirally around the carcass 6 at a small angle of not more than 5 degrees with respect to the tire equator C. For such belt cords 14, organic fiber cords, e.g. nylon, polyester, aromatic polyamide and the like or steel cords can be used. Preferably, the width WB of the belt 7 is in the range of 0.85 to 0.95 times the tread width WT. Here, the belt width WB is measured along the outer surface of the belt, and the tread width WT is measured between the edges F1 and F2 along the tread surface. If less than 0.85 times, the rigidity of the tread edge portion is decreased, and the steering stability is impaired during cornering by largely inclining the machine. If more than 0.95 times, the rubber thickness from the belt edge to the sidewall surface becomes decreased, and the upper sidewall portion is liable to crack with decreasing the durability.

Figure 5:
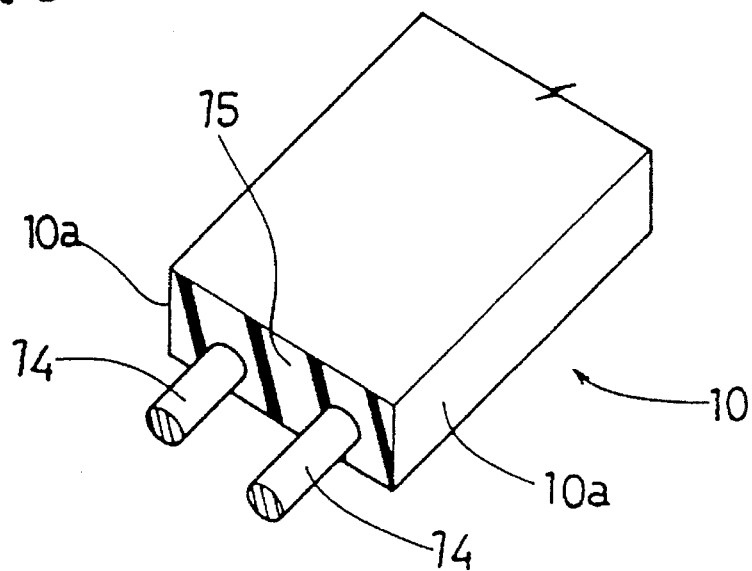
FIG. 5 is an enlarged schematic perspective view of an example of the ribbon-shaped strip.

The above-mentioned belt ply is formed by spirally winding a long continuous narrow-width ribbon-shaped strip 10. The ribbon-shaped strip 10 is, as shown in FIG. 5, formed such that one belt cord or a plurality of parallel belt cords, in this example two cords 14, are embedded in a topping rubber 15.

Such a ribbon-shaped strip 10 is wound continuously from one belt edge F1 near one tread edge E1 to the other belt edge F2 near the other tread edge E2, across the tire equator C.

Figure 6:
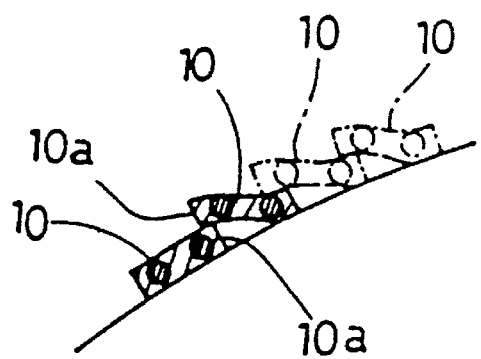
FIG. 6 is a schematic sectional view explaining an example of the spiral winding of the ribbon-shaped strip.
Figure 7A:
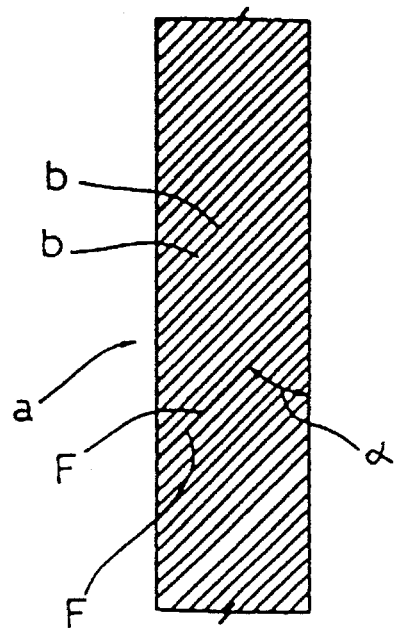
FIGS. 7(A) and (B) are diagrams-showing conventional belts.

In the winding operation of the ribbon-shaped strip 10, as shown in FIG. 6, the confronting side edges 10a and 10a of the strip 10 can be overlapped to prevent loosening.

In all the embodiments shown in FIGS. 1, 2 and 3, the belt 7 is formed of a single ply 7a, but the belt may be of two or more plies. In other words, the ribbon-shaped strip 10 may be wound double or more.

According to the present invention, a pair of axially spaced reinforcing cord layers 9 are disposed radially inside of the belt 7 and outside of the carcass 6.

Each reinforcing cord layer 9 is made of one ply of rubberized parallel organic fiber cords 16, e.g. nylon, rayon, aromatic polyamide and the like, laid at an angle of 20 to 70 degrees to the tire equator C. With respect to the tire equator, the cords of one layer are inclined reversely to the cords of the other layer.

For the topping rubber for the reinforcing cords, a rubber composition having a 100% modulus of 25 to 55 kgf/cm$^2$ is used.

Each of the reinforcing cord layers 9 extends along the outer surface of the carcass 6, axially outwardly from a point P1 in the middle between the tire equator and tread edge, over the belt edge F1 and F2, and then radially inwardly toward the sidewall portion.

The point P1 is spaced apart from the tire equator C as follows. When a straight line N is drawn normal to the tread surface 2A through the point P1, the distance measured along the tread surface 2A from the tire equator C to the normal line N (point O) is in the range of from 0.2 to 0.3 times the above-mentioned tread width WT. Preferably, the distance is 0.25 times the tread width WT.

When a motorcycle is inclined by giving a camber angle in order to change the running direction, if a large time lag occurs until the generation of camber thrust, the driver feels as difficult to run in the intended course, and increases the camber angle for further chamber thrust. However, after a certain time lag, an excessive camber thrust occurs to cause an over-steering. It is therefore, important to shorten the time lag. Thus, such a time lag results in unsteady feelings to the driver in case of motorcycles. Such a time lag can be shortened by increasing the lateral rigidity of the tire, especially ranging from the tread shoulder region 12 to the sidewall portion 5. For straight running, however, it is necessary to decrease the rigidity of the tread center region 11 since the central region contacts with the ground during straight running, and it is important to improve the ground contact for maneuverability and wear resistance.

According to the present invention, the reinforcing cord layers 9 range from the tread shoulder region 12 to the sidewall region, and the angle of the reinforcing cords is crosswise to that of the carcass cords. Therefore, the lateral rigidity of the tire when a camber angle is given thereto, is increased to shorten the time lag, and the steering stability is improved.

Further, the reinforcements in the central region 11 are only the belt cords 14 laid substantially parallel to the circumferential direction and carcass cords laid generally in the axial direction. Accordingly, this region is low in bending rigidity. As a result, vibrations during running due to road undulations and slip between the road surface and tire are effectively decreased, and the tread wear life is prolonged. Further, running noise and harshness are effectively alleviated.

The other end P2 of each reinforcing cord layer 9 is positioned in the range R1 of from 0.1 to 1.0 times the tread edge height HE which is the radial distance from the baseline L to the tread edge E1 and E2.

In FIG. 1, the end P2 is positioned at a height slightly lower than the tread edge height HE so that the layers 9 reinforce only the tread shoulder region 12.

In FIG. 2, the end P2 is positioned at a height H2 slightly higher than 10% of the tread edge height HE so that the layers 9 reinforce both the tread shoulder region 12 and sidewall portion 3. By covering the edge of the carcass turned up portion 6b within the reinforcing cord layer 9, a carcass ply edge separation can be prevented to improve the durability.

In FIGS. 1 and 2, in the sidewall portion 3 and bead portion 4, the reinforcing cord layer 9 is disposed axially outside the carcass turned up portion 6b and not turned up around the bead core 6. In FIG. 3, however, the reinforcing cord layer 9A is extended to the bead base and turned up around the bead core 5, to further extend along the axially inside of the carcass main portion 6a. In this case, also the end P3 thereof is positioned at a height H3 in the same range R2 of from 0.1 to 1.0 times the tread edge height HE. In this example, the end P3 is positioned slightly lower than the tread edge height HE. Accordingly, the sidewall portions 3 are effectively reinforced, and the high speed cornering performance and the engaging force with the rim are effectively improved.

Test tires having a tire size of 190/50 R17 were prepared and tested for the following performances. The specifications of the test tires and test results are shown in Table 1.

1) High speed straight running stability and High speed cornering stability

Test tires were installed in a motorcycle, and the motorcycle was run on a test road at a speed of 260 km/h on a straight course and at 220 km/h on a 400 meter radius curved course. The performance was evaluated by the feeling of the test driver, and expressed by an index based on the prior art tire being 100. The greater the index, the better the performance.

2) Running stability during slow and Middle speed cornering

Running a curved road at a speed of less than 100 km/h, the test tires were tested same as in 1). The result was expressed by an index based on the prior art tire being 100. The greater the index, the better the performance.

3) Durability

Each test tire, which was inflated to 2.5 kgf/cm$^2$ and loaded with 130% of the maximum load specified in Japanese Industrial Standard, was run at a speed of 50 km/h, using a testing drum machine. The result was expressed by an index based on the tire which was successful in 15000 kilometer running without damage as index 100.

4) Vibration ride comfort

The ride comfort was evaluated by the feeling of the test driver through the test 1), and expressed by an index based on the prior art tire being 100. The greater the index, the better the performance.

5) Tire weight

The tire weight was measured, and expressed by an index based on the prior art tire being 100. The greater the index, the heavier the tire weight.

Through the tests, It was confirmed that the example tires were excellent in both high speed and slow speed cornering performances as compared with the prior art tire and comparative example tires. Further, the high speed straight running performance was not inferior as compared with the comparative example tires.

As explained above, in the pneumatic motorcycle tire of the present invention, the belt is formed by spirally winding a ribbon-shaped strip, and a pair of axially spaced reinforcing cord layers are provided inward of the belt to reinforce the tread shoulder region. Therefore, the cornering performance during both high speed and slow speed running can be improved without lowering the high speed straight running performance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

Figure 8:
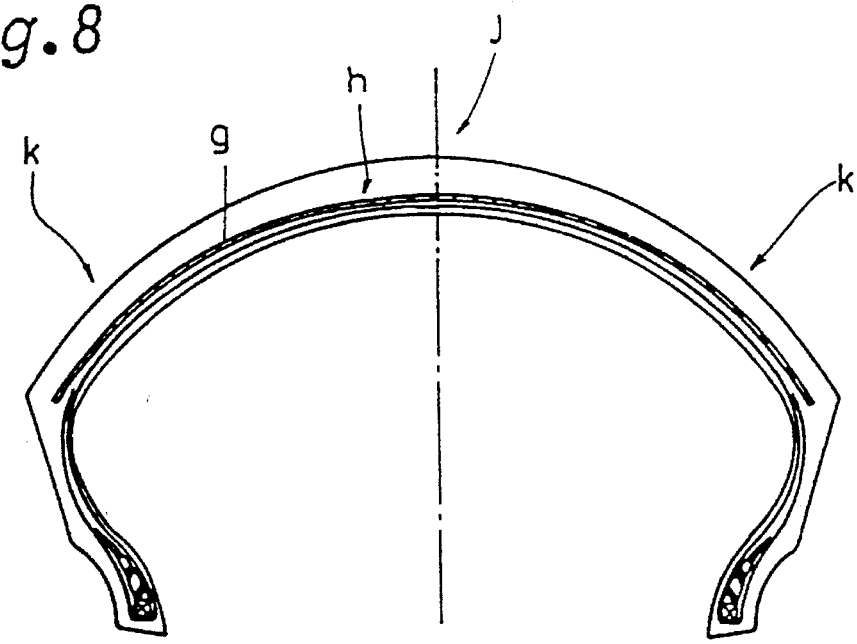
FIGS. 8 and 9 are cross sectional views each showing a prior art tire.
Figure 9:
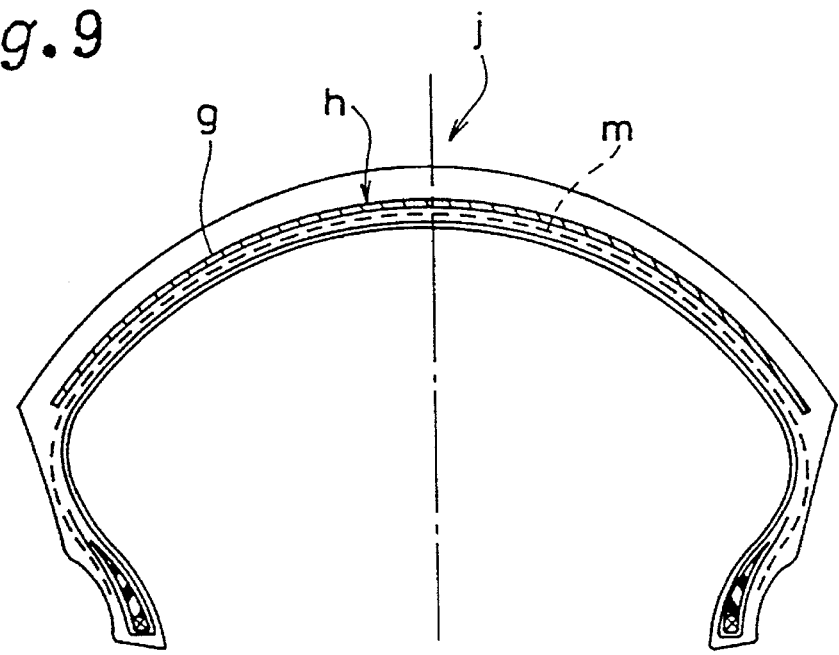

| Tire | Ex.1 | Ex.2 | Ex.3 | Ex.4 | Ex.5 | Ex.6 | Ex.7 | Prior | Ref.1 | Ref.2 | Ref.3 | Ref.4 | Ref.5 | Ref.6 |
|---|---|---|---|---|---|---|---|---|---|---|---|---|---|---|
| Tire construction | FIG. 2 | FIG. 2 | FIG. 2 | FIG. 2 | FIG. 2 | FIG. 5 | FIG. 5 | FIG. 8 | FIG. 9 | FIG. 2 | FIG. 2 | FIG. 2 | FIG. 2 | FIG. 3 |
| Carcass | | | | | | | | | | | | | | |
| No. of ply | | | | | | 1 | | | | | | | | |
| Cord material | | | | | | nylon | | | | | | | | |
| Cord denier (Cord count) | | | | | | 2/1260d (51 ends/5 cm) | | | | | | | | |
| Cord angle | | | | | | 88 degrees to Tire equator | | | | | | | | |
| Turnup height/HE | 0.65 | 0.65 | 0.65 | 0.4 | 0.4 | 0.4 | 0.4 | 0.65 | 0.65 | 0.65 | 0.35 | 0.35 | 0.35 | 0.35 |
| Belt | | | | | | | | | | | | | | |
| Construction | | | | | | Spirally wound strip | | | | | | | | |
| No. of ply | 1 | 1 | | 1 | | | 1 | 1 | 1 | 1 | 1 | 1 | 1 | 1 |
| Width ratio WB/WT | 0.85 | 0.88 | | | | 0.95 | | 0.88 | 0.88 | 0.88 | 0.80 | 1.0 | 0.88 | 0.88 |
| Cord material | aramid | aramid | | | | aramid | | | | | aramid | | | |
| Cord denier | 3/1500d | 3/1500d | | | | 2/1500d | | | | | 3/1500d | | | |
| No. of cord per a strip | 2 | 2 | | | | 2 | | | | | 2 | | | |
| Cord angle to equator (deg) | 0 | 0 | 5 | 0 | 0 | 0 | 0 | 0 | 0 | 0 | 0 | 0 | 0 | 0 |
| 100% modulus of topping rubber (kgf/sq.cm) | 25 | 55 | 35 | 40 | 40 | 40 | 40 | 35 | 35 | 35 | 35 | 35 | 35 | 35 |
| Filler | | | | | | | | non | | | | | | |
| Cord material | | | | nylon | | | | | | | nylon | | | |
| Cord denier | | | | 2/1260d | | | | | | | 2/1260d | | | |
| Cord count (/5cm) | | | | 28 | | | | | | | 28 | | | |
| Cord angle to equator(deg) | 20 | 70 | 45 | 45 | 45 | 45 | 45 | | 40 | 15 | 75 | 40 | 45 | 45 |
| 100% modulus of topping rubber (kgf/sq.cm) | 25 | 55 | 35 | 40 | 40 | 35 | 35 | | 35 | 58 | 35 | 22 | 35 | 35 |
| Position P1/WT | 0.2 | 0.3 | 0.75 | 0.25 | 0.25 | 0.25 | 0.25 | | *1 | 0.4 | 0.1 | 0.3 | 0.2 | 0.3 |
| Position (P2 or P3)/HE | 1.0 | 0.1 | 1.0 | 0.3 | 0.3 | 0.1 | 1.0 | | 1.0 | 0.5 | 1.0 | 1.0 | 0.1 | 1.1 |
| Test Results | | | | | | | | | | | | | | |
| Running stability | | | | | | | | | | | | | | |
| High speed straight | 115 | 115 | 110 | 120 | 120 | 115 | 115 | 100 | 90 | 110 | 90 | 100 | 115 | 115 |
| High speed cornering | 115 | 125 | 115 | 125 | 125 | 120 | 125 | 100 | 105 | 100 | 95 | 100 | 105 | 115 |
| Low/Mid speed cornering | 115 | 115 | 115 | 120 | 120 | 115 | 115 | 100 | 105 | 105 | 95 | 100 | 105 | 115 |
| Durability | 100 | 100 | 100 | 100 | 100 | 100 | 100 | 100 | 100 | 100 | 100 | *2)90 | 100 | 100 |
| Vibration ride comfort | 100 | 100 | 100 | 100 | 100 | 100 | 100 | 100 | 90 | 95 | 95 | 100 | 100 | 95 |
| Tire weight | 106 | 107 | 105 | 106 | 106 | 107 | 108 | 100 | 108 | 105 | 107 | 105 | 105 | 110 |

*1)a continuous one piece filler
*2)a belt edge separation occurred during 13,500 km running

I claim:

1. A pneumatic motorcycle tire comprising a tread portion with axial edges, said tread portion curved so that the maximum cross-sectional width of the tire lies between the tread edges, a pair of axially spaced bead portions, a pair of sidewall portions extending between the tread edges and the bead portions, a pair of bead cores, one disposed in each bead portion, a carcass comprising at least one ply of cords having a main portion extending between the bead portions and a pair of turned up portions each turned up around one of said bead cores, a belt disposed radially outside the carcass and inside the tread portion, said belt consisting of a single ply formed by spirally winding a ribbon-shaped strip of rubber in which at least one cord is embedded along the longitudinal direction thereof, at an angle to the tire equator, said belt having a width in a range of 0.85 to 0.95 times a tread surface width, a pair of axially spaced reinforcing cord layers disposed radially inside of the belt and outside of the carcass, each reinforcing cord layer extending from a point (P1) in the tread portion on each side of the tire equator towards the sidewall portion beyond the belt edge, said point (P1) being spaced apart from the tire equator such that, when a straight line is drawn normal to the tread surface through the point, the distance measured along the tread surface from the tire equator to the normal line is in a range of from 0.2 to 0.3 times the tread surface width measured along a tread surface from one tread edge to the other tread edge, with respect to the tire equator, the cords of one of the reinforcing cord layers are inclined reversely to the cords of the other reinforcing cord layer, each reinforcing cord layer consisting of a single ply of parallel organic fiber cords inclined at an angle of 20 to 70 degrees to the tire equator to cross the carcass cords, said ply of each said reinforcing cord layer being rubberized with a topping rubber having a 100% modulus of 25 to 55 kgf/cm$^2$, each reinforcing cord layer has a radially inner edge extended to near the bead core, not turned up around the bead core, and terminated at a height in a range of from 0.1 to 0.3 times a height of a tread edge, each measured from a base of the bead portion.

2. A pneumatic motorcycle tire comprising a tread portion with axial edges, said tread portion curved so that the maximum cross-sectional width of the tire lies between the tread edges, a pair of axially spaced bead portions, a pair of sidewall portions extending between the tread edges and the bead portions, a pair of bead cores, one disposed in each bead portion, a carcass having a main portion extending between the bead portions and a pair of turned up portions each turned up around one of said bead cores, a belt disposed radially outside the carcass and inside the tread portion, said belt formed by spirally winding a ribbon-shaped strip of rubber ill which at least one cord is embedded along the longitudinal direction thereof, at an angle to the tire equator, said belt having a width in a range of 0.85 to 0.95 times a tread surface width, a pair of axially spaced reinforcing cord layers disposed radially inside of the belt and outside of the carcass, each reinforcing cord layer extending from a point (P1) in the tread portion on each side of the tire equator towards the sidewall portion beyond the belt edge, said point (P1) being spaced apart from the tire equator such that, when a straight line is drawn normal to the tread surface through the point, the distance measured along the tread surface from the tire equator to the normal line is in a range of from 0.2 to 0.3 times the tread surface width measured along a tread surface from one tread edge to the other tread edge, each reinforcing cord layer comprising a ply of parallel organic fiber cords inclined at an angle of 20 to 70 degrees to the tire equator, said ply rubberized with a topping rubber having a 100% modulus of 25 to 55 kgf/cm$^2$, each reinforcing cord layer has a radially inner edge extended to near the bead core, not turned up around the bead core, and terminated at a height in a range of from 0.1 to 0.3 times a height of a tread edge, each measured from a base of the bead portion.

3. The tire according to claim 2, wherein, with respect to the tire equator, the cords of one of the reinforcing cord layers are inclined reversely to the cords of the other reinforcing cord layer.

* * * * *

UNITED STATES PATENT AND TRADEMARK OFFICE
CERTIFICATE OF CORRECTION

PATENT NO. : 5,482,102
DATED : January 9, 1996
INVENTOR(S) : SUZUKI

It is certified that error appears in the above-indentified patent and that said Letters Patent is hereby corrected as shown below:

(Extending beneath column 8, line 6)

Table 1, Change "Fig. 5" to --Fig. 3-- (both instances).

Signed and Sealed this

Fourteenth Day of October, 1997

Attest:

BRUCE LEHMAN

*Attesting Officer*   *Commissioner of Patents and Trademarks*